(12) United States Patent
Kitahara et al.

(10) Patent No.: US 6,962,045 B2
(45) Date of Patent: Nov. 8, 2005

(54) EXHAUST GAS APPARATUS AND METHOD FOR PURIFYING EXHAUST GAS IN INTERNAL COMBUSTION ENGINE

(75) Inventors: Yasuhisa Kitahara, Yokohama (JP); Manabu Miura, Zushi (JP) JPX; Hiroyuki Itoyama, Yokohama (JP); Takashi Shirakawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/441,114

(22) Filed: May 20, 2003

(65) Prior Publication Data

US 2003/0213235 A1    Nov. 20, 2003

(30) Foreign Application Priority Data

May 20, 2002   (JP) ............................. 2002-145366

(51) Int. Cl.⁷ ............................................... F01N 3/00
(52) U.S. Cl. ........................... 60/295; 60/276; 60/285; 60/286; 60/297
(58) Field of Search .................... 60/274, 276, 277, 60/285, 286, 295, 297, 301, 303, 311

(56) References Cited

U.S. PATENT DOCUMENTS

| | | | |
|---|---|---|---|
| 5,473,887 A | | 12/1995 | Takeshima et al. |
| 5,746,989 A | * | 5/1998 | Murachi et al. .......... 423/213.7 |
| 5,974,791 A | * | 11/1999 | Hirota et al. ................. 60/276 |
| 6,189,316 B1 | * | 2/2001 | Surnilla et al. ............... 60/274 |
| 6,233,927 B1 | * | 5/2001 | Hirota et al. ................. 60/297 |
| 6,574,956 B1 | * | 6/2003 | Moraal et al. ................ 60/295 |
| 6,615,580 B1 | * | 9/2003 | Khair et al. .................. 60/286 |
| 6,718,757 B2 | * | 4/2004 | Khair et al. .................. 60/286 |
| 6,758,036 B1 | * | 7/2004 | Molinier ...................... 60/286 |

FOREIGN PATENT DOCUMENTS

| | | |
|---|---|---|
| DE | 198 50 757 A1 | 2/2000 |
| EP | 1 086 741 A2 | 3/2001 |
| EP | 1 174 600 A2 | 1/2002 |
| EP | 1 102 920 B1 | 9/2002 |
| JP | 2600492 B2 | 1/1997 |
| JP | 2722987 B2 | 11/1997 |
| WO | WO03/031780 A1 | 4/2003 |

* cited by examiner

Primary Examiner—Tu M. Nguyen
(74) Attorney, Agent, or Firm—Foley & Lardner LLP

(57) ABSTRACT

A diesel particulate filter 14 that traps particulate matters in an exhaust gas and a NOx trap catalyst 13 that traps NOx in the exhaust gas are disposed in an exhaust passage (10) in an internal combustion engine (1). When a regeneration timing of the diesel particulate filter (14) and one of a regeneration timing of SOx and a regeneration timing of NOx are overlapped, the diesel particulate filter regeneration is carried out first and thereafter, the SOx regeneration or the NOx regeneration is carried out.

2 Claims, 13 Drawing Sheets

THRESHOLD VALUE OF EXHAUST GAS PRESSURE OF DPF

TARGET INTAKE AIR AMOUNT FOR
PREVENTION OF DPF MELTING

POST INJECTION AMOUNT PER UNIT FOR TEMPERATURE INCREASE

TARGET INTAKE AIR AMOUNT FOR ENGINE OPERATION WITH STOICHIOMETRIC-AIR-FUEL RATIO

TARGET INTAKE AIR AMOUNT FOR ENGINE
OPERATION WITH RICH-SPIKE-AIR-FUEL RATIO

EXHAUST GAS APPARATUS AND METHOD FOR PURIFYING EXHAUST GAS IN INTERNAL COMBUSTION ENGINE

BACKGROUND OF THE INVENTION

1. Field of the Invention

This invention relates to an exhaust gas apparatus and a method for purifying an exhaust gas in an internal combustion engine.

2. Related Art of the Invention

There is known an apparatus for purifying an exhaust gas disclosed in a Japanese Issue Patent Publication No. 2722987. The earlier technology includes a diesel particulate filter (DPF) and a NOx trap catalyst disposed in an exhaust passage wherein the DPF traps particulate matters (PM) in an exhaust gas and the NOx trap catalyst traps NOx in the exhaust gas flowing when an air-fuel ratio in the exhaust gas is in a lean range and purifies the trapped NOx when the air-fuel ratio is in a rich range. The particulate matters deposited in the DPF and the NOx deposited in the NOx trap catalyst are respectively purified at a predetermined period of time.

SUMMARY OF THE INVENTION

The NOx trap catalyst traps the NOx in the exhaust gas when the air-fuel ratio is in a lean range and further traps SOx in the exhaust gas. An increase of SOx deposit amount lowers NOx trap efficiency and therefore, it is required to purify the SOx deposited when the SOx deposit amount exceeds a predetermined amount. Since regeneration timing for each of the Sox, the DPF, and NOx is different, the regeneration timing thereof are overlapped in some cases. However, in this earlier technology, which regeneration of them should be prioritized has not been studied in case where each regeneration timing thereof is overlapped. For example, when a Sox regeneration is carried out before a regeneration of a DPF, a particulate matter deposit in the DPF increases until the DPF regeneration is carried out, thereby rising up an exhaust temperature. Therefore, a driveability of an engine deteriorates and an exhaust performance thereof is adversely affected.

One aspect of the present invention, from a viewpoint of the foregoing problems, provides an apparatus where when timing of DPF regeneration takes place simultaneously with timing of SOx regeneration or timing of NOx regeneration, the DPF regeneration is carried out with a first priority and thereafter, the SOx regeneration or the NOx regeneration is carried out.

These and other aspects, and features of this invention will be understood from the following description with accompanying drawings.

DETAILED EXPLANATION OF THE PREFERRED EMBODIMENTS

Figure 1:
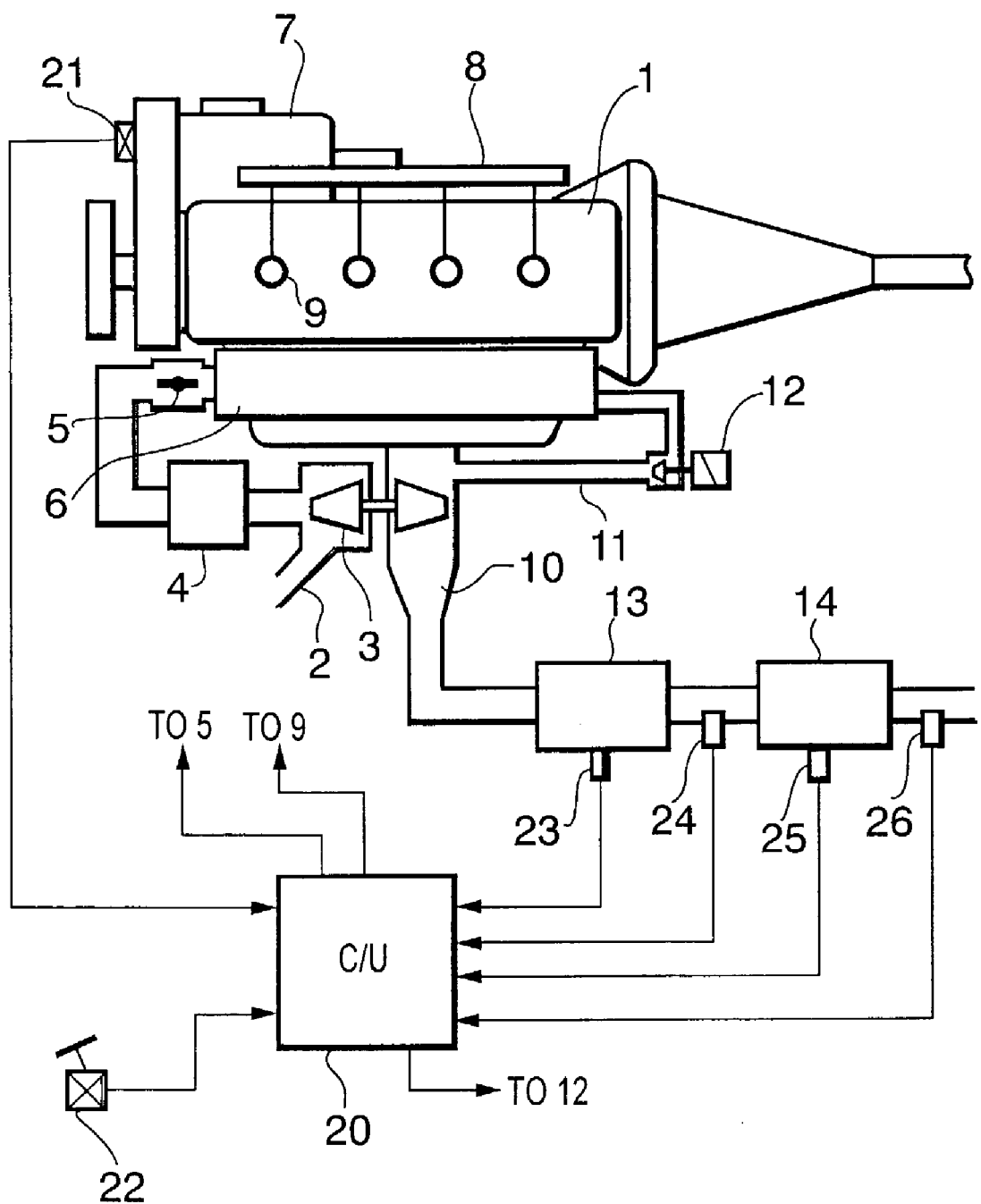
FIG. 1 is a system view of an engine of an embodiment according to the invention.

Embodiments according to the invention will be explained with reference to the drawings. FIG. 1 is a system view of an internal combustion engine (herein, a diesel engine 1) showing an embodiment according to the invention.

An intake compressor of a variable-nozzle-type turbocharger 3 is disposed in an intake passage 2 of a diesel engine 1. An intake air is supercharged by the intake compressor, cooled in an intercooler 4, passes through an intake throttle valve 5 and through a collector 6, and flows into a combustion chamber of each cylinder.

Fuel is pressurized by a high-pressure-fuel pump 7 and then, sent to a common rail 8 and is directly injected into the combustion chamber from a fuel injector 9 of each cylinder (common-rail-type-fuel injection apparatus). Air flowing into the combustion chamber and fuel injected thereto are compression-ignited and an exhaust gas thereof flows into an exhaust passage 10. Part of the exhaust gas flowing into exhaust passage 10 is recirculated back to an intake side as an EGR gas through an EGR passage 11 by an EGR valve 12. The rest of the exhaust gas passes through an exhaust turbine of turbocharger 3 and drives it.

A NOx trap catalyst 13 is disposed downstream of the exhaust turbine in exhaust passage 10 wherein the NOx of the exhaust gas flowing when an air-fuel ratio of the exhaust gas is in a lean range is trapped and the trapped Nox is purified when an air-fuel ratio of the exhaust gas is in a rich range. NOx trap catalyst 13 carries an oxidizing catalyst (precious metal) to oxidize exhaust components (HC, CO) flowing thereto.

DPF 14 that traps particulate matters in the exhaust gas is disposed downstream of NOx trap catalyst 13. DPF 14 carries an oxidizing catalyst (precious metal) to oxidize exhaust components (HC, CO) flowing thereto. NOx trap catalyst 13 and DPF 14 may reversely be positioned and a DPF may carry a NOx trap catalyst being formed integrally therewith.

A control unit (controller) 20 receives signals from an engine rotation speed sensor 21 that detects an engine rotation speed Ne, and an opening angle sensor 22 that detects an opening angle of an acceleration pedal for controlling engine 1 and also from a catalyst temperature sensor 23 that detects a temperature (catalyst temperature) of NOx trap catalyst 13, an exhaust gas pressure sensor 24 that detects an exhaust gas pressure at an inlet side of DPF 14 in exhaust passage 10, a DPF temperature sensor 25 that detects a temperature (DPF temperature) of DPF 14, and an air-fuel ratio sensor 26 that detects an air-fuel ratio (hereinafter, exhaust λ shown as an air-excess rate) of the exhaust gas at an outlet side of DPF 14 in exhaust passage 10.

The temperature of NOx trap catalyst 13 and DPF 13 may be indirectly detected as an exhaust gas temperature with an exhaust gas temperature sensor disposed downstream thereof.

Control unit 20, based upon these input signals, outputs a fuel injection command signal to fuel injector 9 for controlling a fuel injection amount and timing of a main injection and a post injection at a predetermined engine operating condition (during expansion stroke or exhaust stroke) after the main injection by fuel injector 9, an opening angle command signal to intake throttle valve 5, and an opening angle command signal to EGR valve 12.

Control unit 20 performs an exhaust purification control for purifying particulate matters trapped and deposited on DPF 14 (DPF regeneration), NOx trapped and deposited on NOx trap catalyst 13 (NOx regeneration), and SOx deposited on NOx trap catalyst 13 by SOx poisoning (SOx regeneration). The exhaust purification control will be explained in detail as follows.

Figure 2:
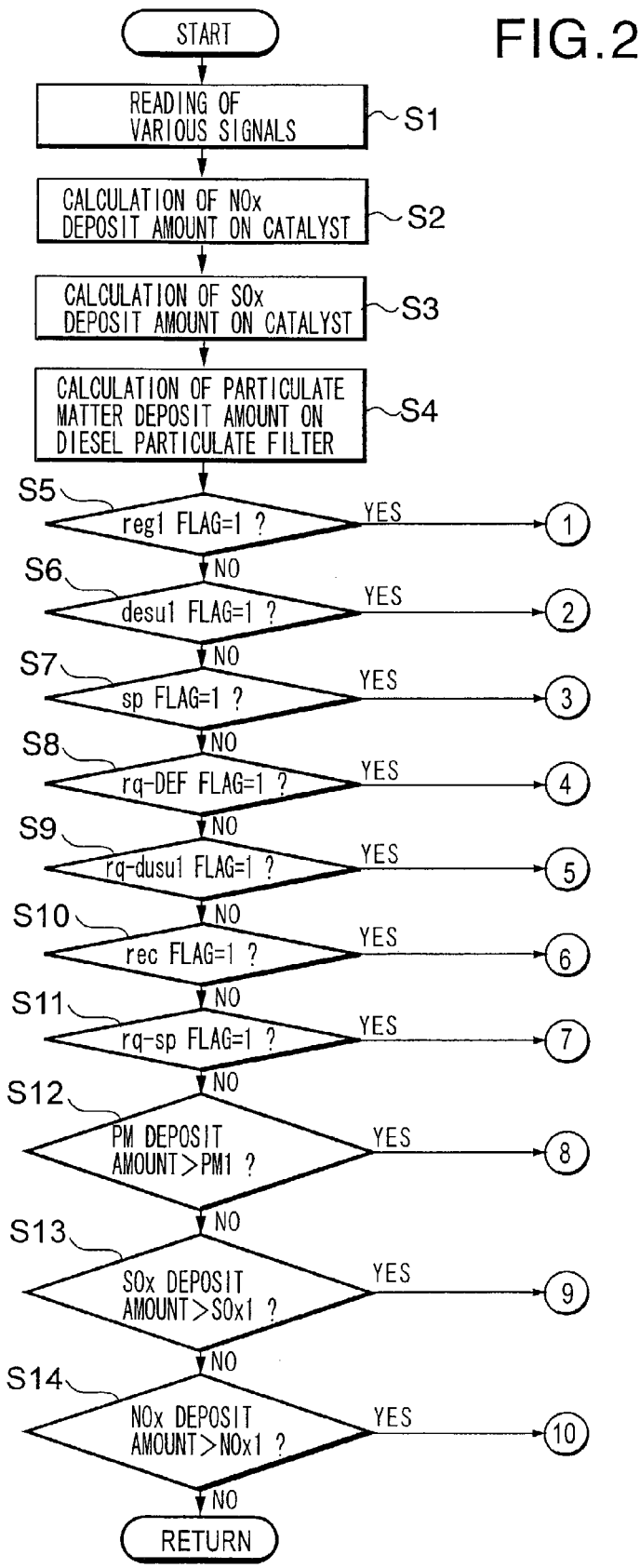
FIG. 2 is a flowchart of an exhaust purification control (1).

FIG. 2–FIG. 12 shows a flowchart of an exhaust purification control executed in control unit 20, which will be explained along with a flowchart in FIG. 2 first. When the process goes to RETURN in a flowchart in FIG. 2–FIG. 12, all routines go back to START in a flowchart in FIG. 2.

At S 1, control unit 20 reads various sensor signals and detects an engine rotation speed Ne, an opening angle APO of the acceleration pedal, a catalyst temperature, an exhaust gas pressure in the inlet side of DPF 14, a DPF temperature, and an exhaust λ in the outlet side of DPF 14 and further reads a fuel injection amount (main injection amount) Q calculated from a map having the engine rotation speed Ne and the opening angle APO of the acceleration pedal as parameters.

At S 2, control unit 20 calculates a NOx deposit amount trapped and deposited on NOx trap catalyst 13. For example, as calculation of a NOx absorption amount described in a Japanese Issue Patent Publication No. 2600492, the NOx deposit amount may be estimated from an integral value of an engine rotation speed or from a running distance of a vehicle. In case of use of the integral value, at a point where NOx regeneration is completed (including a point where NOx regeneration is carried out caused by SOx regeneration completion), the integral value is reset.

At S 3, a SOx deposit amount deposited on NOx trap catalyst 13 by SOx poisoning is calculated. In the same as the calculation of the above NOx deposit amount, the SOx deposit amount may be estimated from an integral value of the engine rotation speed or from a running distance of a vehicle. In case of use of the integral value, at a point where the SOx regeneration is completed, the integral value is reset.

At S 4, the particulate matters trapped and deposited on DPF 14 are calculated as follows. As the particulate matter deposit amount of DPF 14 increases, an exhaust gas pressure in the inlet side of DPF 14 is bound to increase. Therefore, the exhaust gas pressure in the inlet side of DPF 14 is detected by the exhaust gas pressure sensor and then, is compared with a reference exhaust gas pressure in a present engine operating condition (engine rotation speed Ne, fuel injection amount Q). As a result, the particulate matter deposit amount is estimated and may be estimated from a combination of an integral value of the engine rotation speed or a running distance after a previous DPF regeneration and the exhaust gas pressure.

At S 5, it is judged whether or not reg 1 flag for showing "during a DPF regeneration mode" is set up. If reg 1 flag=1, the process goes to control of a DPF regeneration mode in FIG. 3 described later.

At S 6, it is judged whether or not desul flag for showing "during a SOx regeneration mode" (release mode of SOx poisoning on NOx trap catalyst) is set up. If desul flag=1, the process goes to control of a SOx regeneration mode in FIG. 4 described later.

At S 7, it is judged whether or not sp flag for showing "during a NOx regeneration mode" (rich-spike mode of exhaust λ for NOx purge and purification on NOx trap catalyst) is set up. If sp flag=1, the process goes to control of a NOx regeneration mode in FIG. 5 described later.

At S 8, it is judged whether or not rq-DPF flag for showing "DPF regeneration demand" is set up. If the DPF regeneration demand is made and rq-DPF flag=1, the process goes to a flowchart in FIG. 6 described later wherein regeneration priority is decided in case the DPF regeneration demand is made At S 9, it is judged whether or not rq-desul flag for showing "SOx regeneration demand" is set up. If the SOx regeneration demand is made and rq-desul flag=1, the process goes to a flowchart in FIG. 7 described later wherein regeneration priority is decided in case the SOx regeneration demand is made.

At S 10, it is judged whether or not rec flag for showing "during a prevention mode of DPF melting after DPF regeneration or SOx regeneration is carried out is set up. If rec flag=1, the process goes to control of the prevention mode of the melting in FIG. 8 described later.

At S 11, it is judged whether or not rq-sp flag for showing "NOx regeneration demand" is set up. If the NOx regeneration demand is made and rq-sp flag=1, the process goes to a flowchart in FIG. 9 wherein at S 701, sp flag=1 for starting the NOx regeneration and at 702, rq-sp flag=0.

At S 12, it is judged whether or not it is time to regenerate the DPF based upon when the particulate matter amount on DPF 14 calculated at S 4 reaches a predetermined value PM 1.

Figure 13:
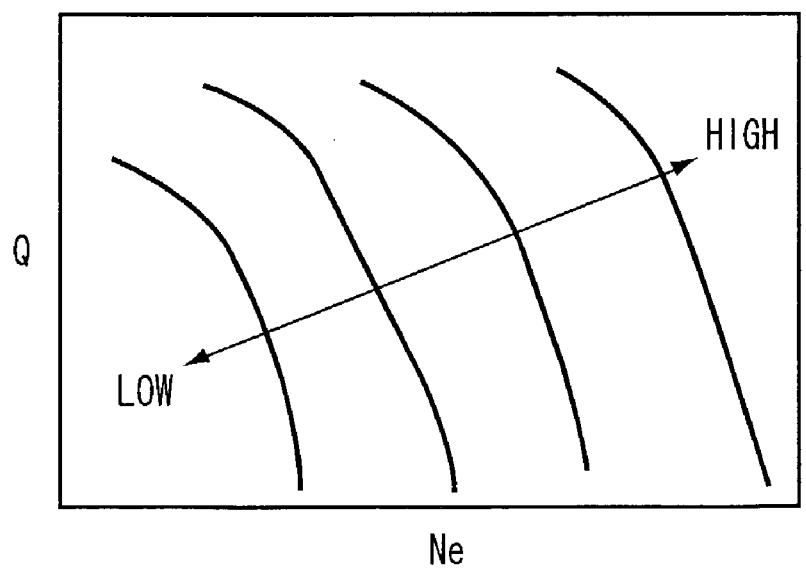
FIG. 13 is a map showing an exhaust pressure threshold value of a DPF.

An exhaust gas pressure in the inlet side of DPF 14 is determined for each engine operating condition (Ne, Q) at a point where the particulate matter amount on the DPF 14 reaches a predetermined value PM 1 and then, that relation between the exhaust gas pressure and each engine operating condition may be described as a map shown in FIG. 13. It may be judged that it is time to regenerate the DPF 14 (PM deposit amount>PM 1) when the exhaust gas pressure therein detected by the exhaust gas pressure sensor comes to an exhaust gas pressure threshold value corresponding to a current engine operating condition (Ne, Q) in the map in FIG. 13.

Figure 10:
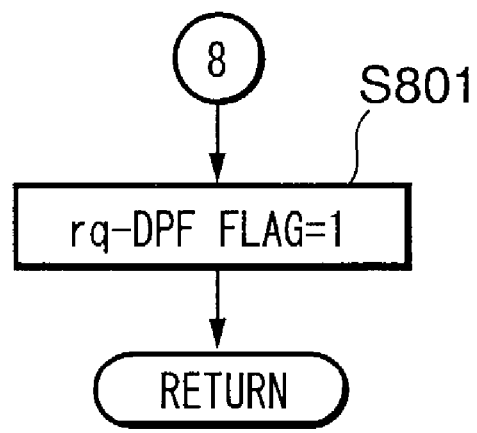
FIG. 10 is a flowchart of an exhaust purification control (9).

If it is judged that it is time to regenerate DPF 14 based upon a relation "PM deposit amount>PM 1". the process goes to a flowchart in FIG. 10 wherein at S 801, rq-DPF flag is set as 1 and the DPF regeneration demand is set.

Figure 11:
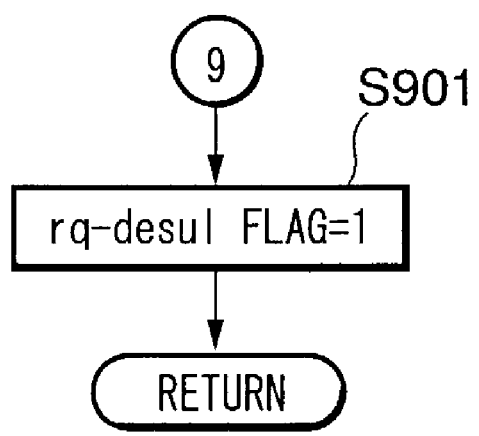
FIG. 11 is a flowchart of an exhaust purification control (10).
Figure 12:
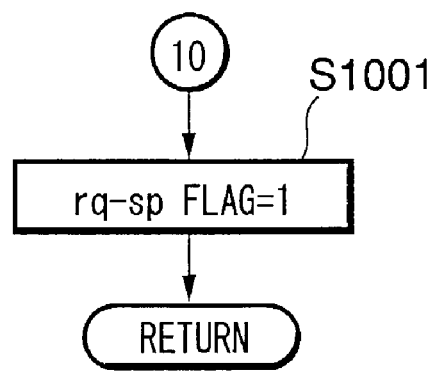
FIG. 12 is a flowchart of an exhaust purification control (11).

At S 13, it is judged whether or not it is time to regenerate SOx based upon when the SOx deposit amount on NOx trap catalyst 13 calculated at S 3 reaches a predetermined value SOx 1. if it is judged it is time to regenerate SOx based upon a relation "SOx deposit amount>SOx 1" (time to release SOx poisoning on NOx trap catalyst 13), the process goes to a flowchart in FIG. 11 wherein at S 901, rq-desu I flag is set as 1 and the SOx regeneration demand is set.

At S 14, it is judged whether or not it is time to regenerate NOx based upon when the NOx deposit amount on NOx trap catalyst 13 calculated at S 2 reaches a predetermined value. If it is judged it is time to regenerate NOx based upon a relation "NOx deposit amount>NOx 1" (time to purge and purify NOx on NOx trap catalyst 13), the process goes to a flowchart in FIG. 12 wherein at S 1001, rq-sp flag is set as 1 and the NOx regeneration demand is set.

Figure 3:
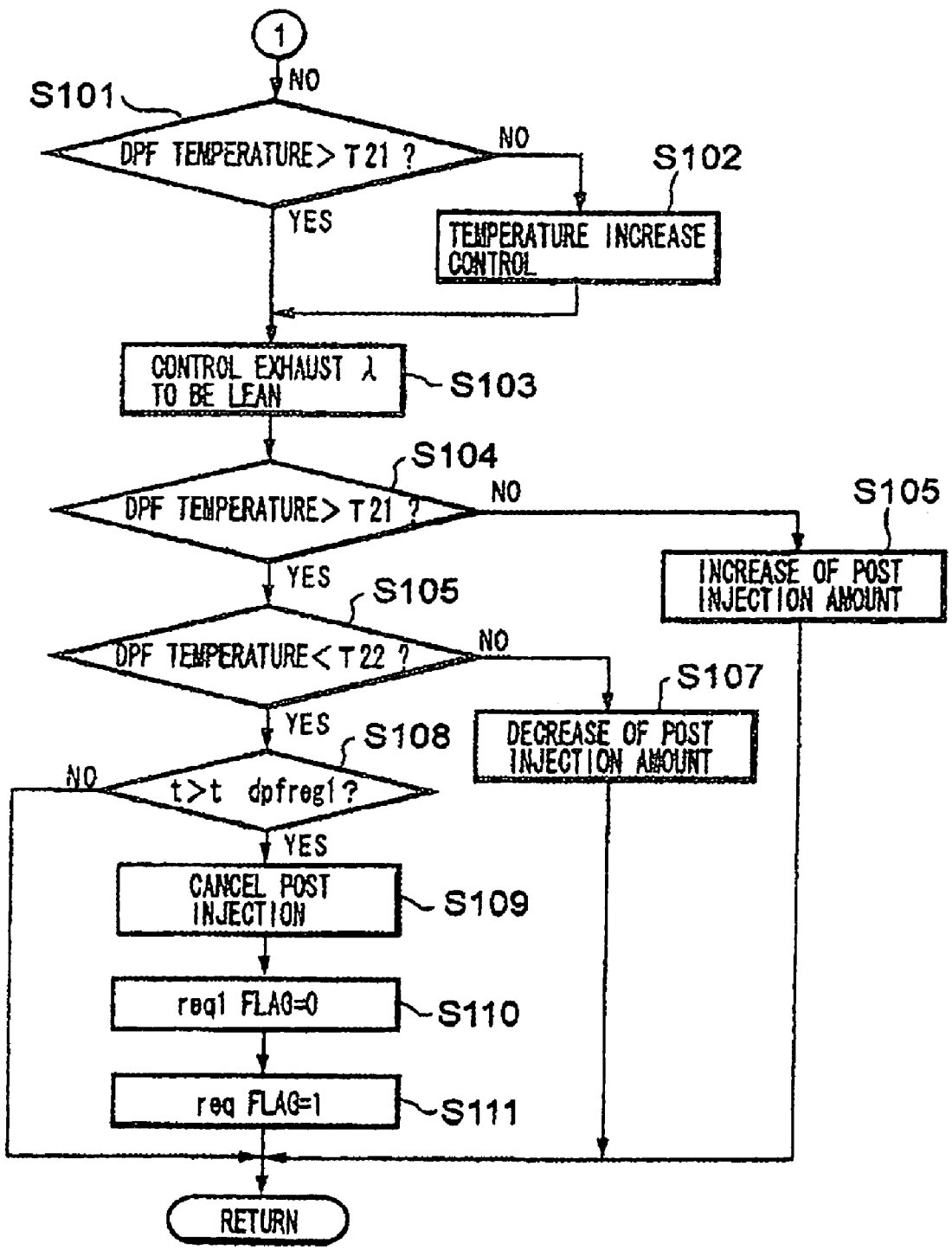
FIG. 3 is a flowchart of an exhaust purification control (2).

Control of the DPF regeneration mode in FIG. 3 will be explained. When the PM deposit amount reaches a predetermined value, rq-DPF flag=1. Accordingly, if reg 1 flag=1 in a flowchart in FIG. 6 described later, the routine in FIG. 3 starts.

At S 101, it is judged whether or not a DPF temperature rises up beyond a predetermined value T21 that is high enough for burning the PM. When the DPF temperature does not rise up beyond T21, the process goes to S 102 wherein the DPF temperature is controlled to rise by throttling an intake air until the DPF temperature reaches a predetermined value. When the DPF temperature rises beyond a predetermined value T21, the process goes to S 103.

Figure 14:
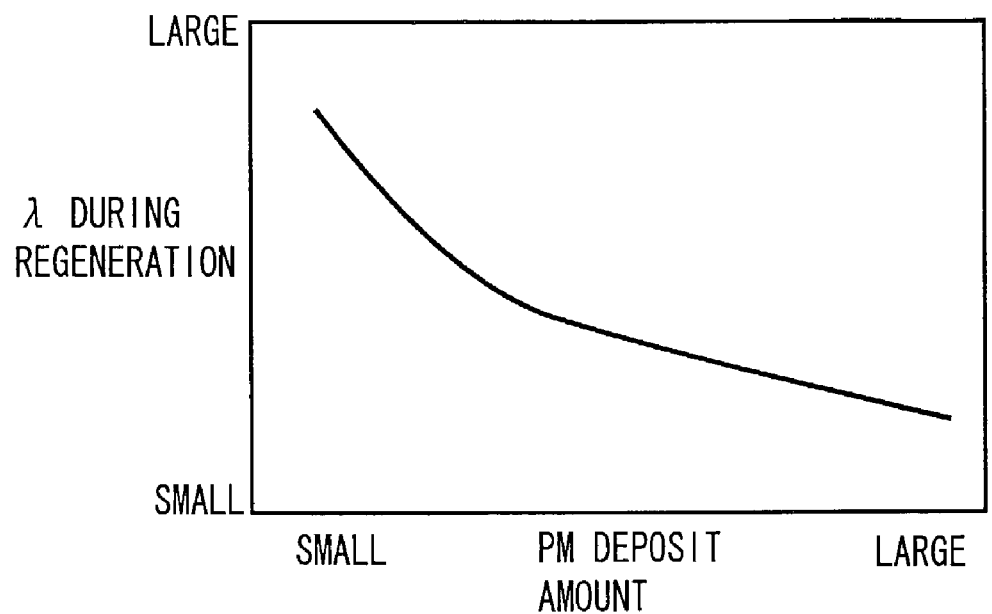
FIG. 14 is a table showing a target exhaust λ during regeneration of a particulate matter deposit.
Figure 15:
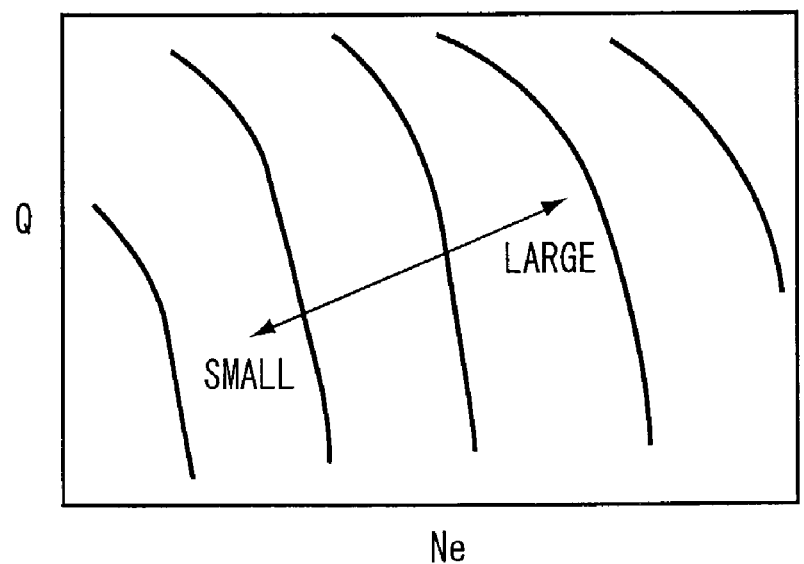
FIG. 15 is a table showing a target intake air amount for preventing the DPF from being melted.

At S 103, an exhaust λ is controlled to be in a lean range for DPF regeneration. The exhaust λ targeted is set corresponding to a PM deposit amount that is bound to deposit on DPF 14 based upon FIG. 14. As the PM deposit amount is larger, the exhaust λ targeted is set smaller (richer side). Because as the PM deposit amount is larger, PM burning propagation during the DPF regeneration becomes more active, causing DPF 14 to be more likely to be melted. The control of the exhaust λ is performed by use of the throttle valve and basically an intake air is controlled to be a target intake air amount shown in FIG. 15. If the exhaust λ is away from the target value, the intake air is controlled further so that the exhaust λ reaches the target value.

At S 104, it is judged again whether or not the DPF temperature rises up beyond a predetermined value T21 (target-lower limit temperature during regeneration), for the DPF temperature possibly becomes below T21 by controlling the exhaust λ at S 103. When the DPF temperature is below T21, the process goes to S 105.

Figure 16:
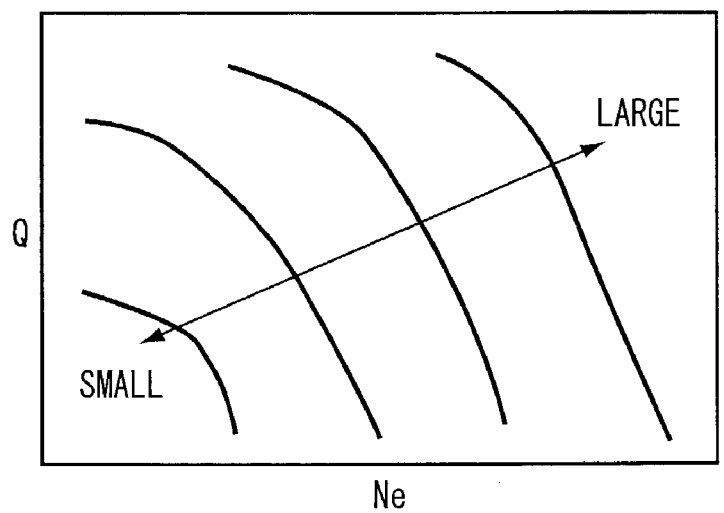
FIG. 16 is a map showing a post injection amount per unit for increasing a temperature.

At S 105, a post injection is carried out corresponding to an engine operating condition (Ne, Q) shown in FIG. 16 or the post injection amount post Q is increased.

At S 106, it is judged whether or not the DPF temperature is below a target-upper limit temperature T22 during regeneration. When the DPF temperature is more than T22, the process goes to S 107.

At S 107, the post injection stops or the post injection amount post Q is decreased, for if the DPF temperature excessively increases due to PM burning, the DPF might be melted. Variations in the post injection causes variations in the exhaust λ, but subsequent modification of the intake air amount at S 103 enables the target exhaust λ and target DPF temperature.

At S 108, it is judged whether or not a predetermined time in the DPF regeneration mode (target exhaust λ and DPF temperature) elapses. When the predetermined time elapses, since the PM is burned and removed properly and the DPF regeneration is considered completed, the process goes to S 109.

At S 109, since the DPF regeneration is completed, the post injection stops and heating DPF 14 is stopped.

At S 110, since the DPF regeneration is completed, reg I flag is set as 0.

At S 111, in case some of the particulate matters are left unburned after the DPF regeneration is completed, when the exhaust λ is controlled to be rapidly increased, the particulate matters on DPF 14 burn for a moment, possibly damaging DPF 14 by melting thereof. Therefore, rec flag is set as 1 to proceed with a prevention mode of DPF melting.

Control of a SOx regeneration mode in FIG. 4 will be explained. A SOx deposit amount reaches a predetermined value SOx 1 and rq-desul flag=1. Then, when desul flag=1 by a flowchart in FIG. 7, a routine in FIG. 4 starts.

At S 201, it is judged whether or not a catalyst temperature (a carrier temperature of NOx trap catalyst 13) goes beyond a predetermined value that is high enough for regenerating the SOx. When the catalyst temperature does not go beyond a predetermined value, the process goes to S 202. The regeneration of the SOx requires the conditions that the exhaust λ is in from a stoichiometric to rich range, as well as the catalyst temperature goes beyond a predetermined value. For example, when using a NOx trap catalyst such as Ba, since the catalyst temperature is required to be more than 600 degrees C. in the range of from a stoichiometric to a rich value, T4 is set as more than 600 degrees C.

At S 202, the catalyst temperature is controlled to rise by throttling an intake air until the catalyst temperature reaches a predetermined value T4. When the catalyst temperature goes beyond a predetermined value T4, the process goes to S 203.

Figure 17:
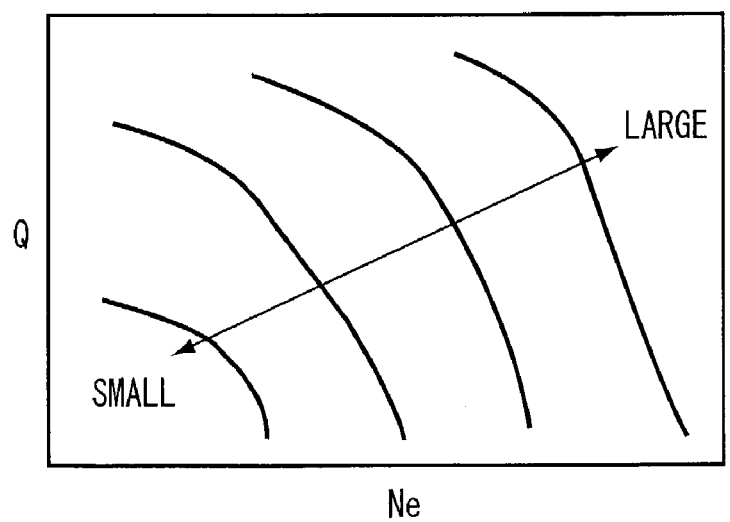
FIG. 17 is a table showing a target-intake air amount for an engine operation in a stoichimetric value of an air-fuel ratio.

At S 203, the exhaust λ is controlled to be in a stoichiometric range for regenerating the SOx. Namely, basically an intake air is controlled by the throttle valve to be a target intake air amount for an engine operation in the exhaust λ of a stoichiometric range shown in FIG. 17. If the exhaust λ is away from the stoichiometric range, the intake air is controlled more so that the exhaust λ reaches the stoichiometric range.

At S 204, it is judged again whether or not the catalyst temperature rises up beyond a predetermined value T4, for the catalyst temperature possibly becomes below T4 by controlling the exhaust λ at S 203. When the catalyst temperature is below T4, the process goes to S 205.

At S 205, a predetermined post injection is carried out for increasing the catalyst temperature according to FIG. 16. The post injection causes variations in the exhaust λ, but subsequent modification of the intake air amount at S 203 enables the target exhaust λ and the target catalyst temperature.

At S 206, it is judged whether or not a predetermined time in the SOx regeneration mode (target exhaust λ and catalyst temperature) elapses. When a predetermined time elapses, since SOx regeneration is considered completed, the process goes to S 207.

At S 207, since the SOx regeneration is completed, the engine operation in the exhaust λ of a stoichiometric range is cancelled.

At S 208, since the SOx regeneration is completed, desul flag is set as 0.

At S 209, in case some of the particulate matters on DPF 14 are left unburned under this high temperature after the SOx regeneration is completed, when the exhaust λ is controlled to be rapidly increased, the particulate matters on DPF 14 burn for a moment, possibly damaging DPF 14 by melting thereof.

Therefore, rec flag is set as 1 to proceed with a prevention mode of DPF melting.

At S 210, rq-sp flag is set as 0. The reason is, when the SOx is regenerated, the NOx trap catalyst 13 is exposed to an atmosphere of the exhaust λ of a stoichiometric range for a long time. Therefore, the NOx regeneration is carried out simultaneously. Accordingly, if the NOx regeneration demand is already set, the demand is withdrawn by setting rq-sp flag to 0 as the above.

Figure 5:
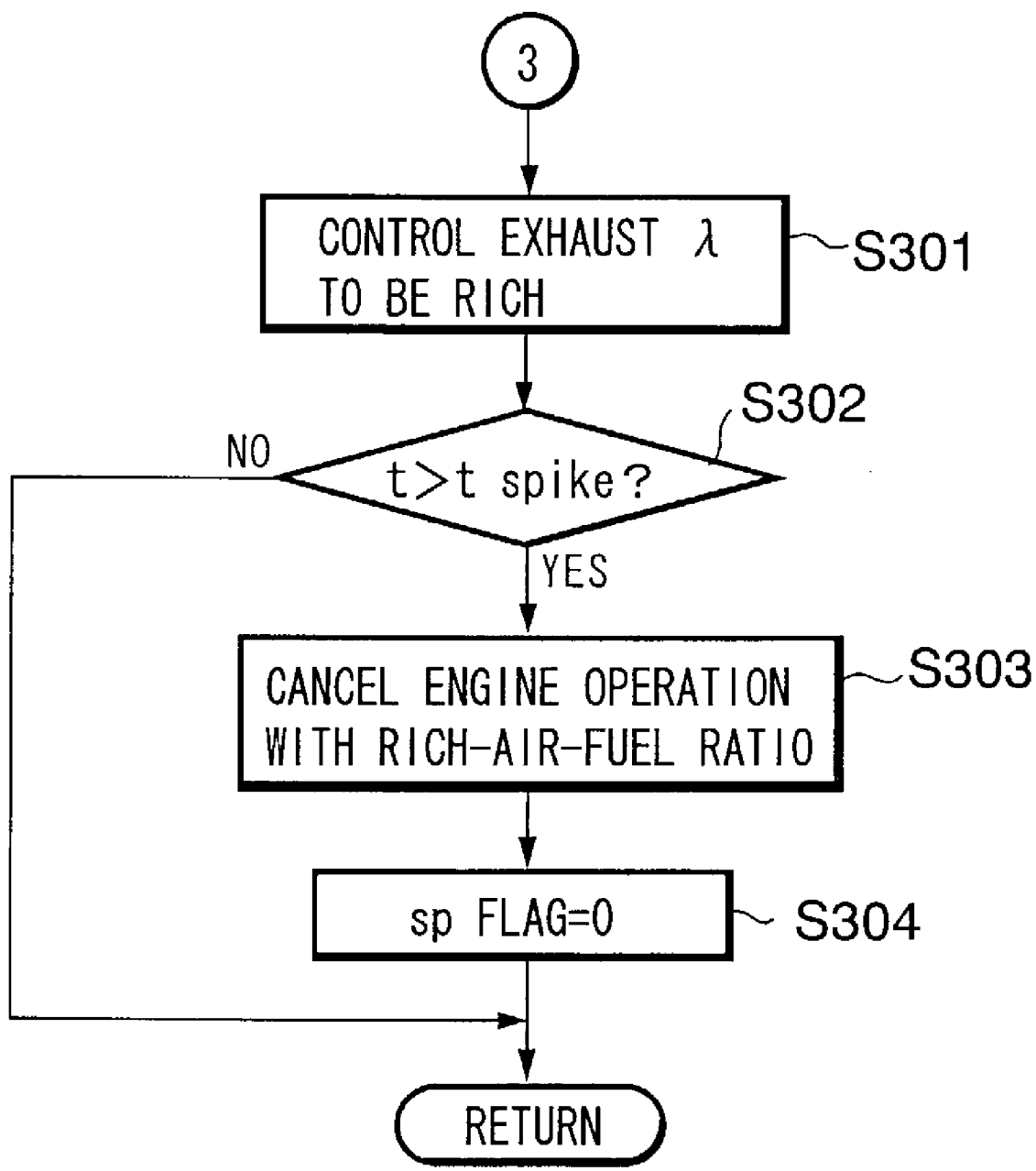
FIG. 5 is a flowchart of an exhaust purification control (4).

Control of a Nox regeneration mode in FIG. 5 will be explained. The NOx deposit amount reaches a predetermined value NOx 1 and rq-sp flag=1. Then, when sp flag=1 according to a flowchart in FIG. 6, 7, or 9 described later, a routine in FIG. 5 starts.

Figure 18:
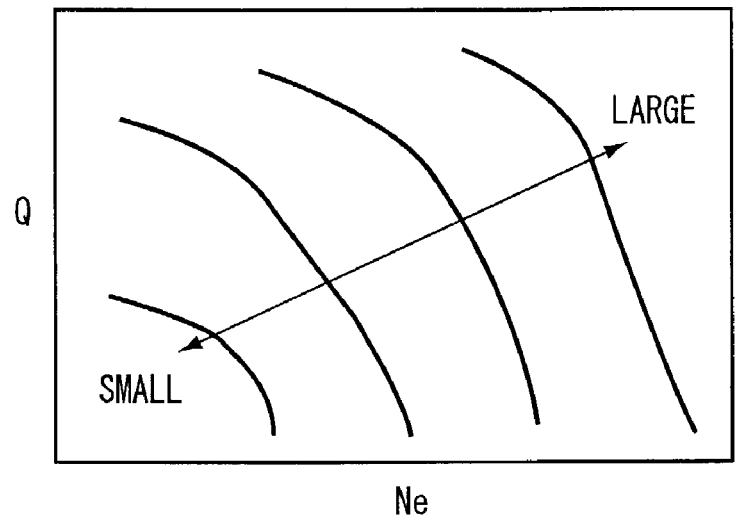
FIG. 18 is a map showing a target intake air amount for an engine operation in a rich spike value of an air-fuel ratio.

At S 301, the exhaust $\lambda$ is controlled to be in a rich range for regenerating the NOx. Namely, basically an intake air is controlled by the throttle valve to be a target intake air amount for an engine operation in the exhaust $\lambda$ of a rich-spike range shown in FIG. 18. If the exhaust $\lambda$ is away from the target value, the intake air is controlled more so that the exhaust $\lambda$ reaches the target value.

At S 302, it is judged whether or not a predetermined time t spike in the NOx regeneration mode (an air-fuel ratio of a rich range) elapses. When the predetermined time elapses, since the NOx regeneration is considered completed, the process goes to S 303 (t spike<t desul).

At S 303, since the NOx regeneration is completed, the engine operation in the exhaust $\lambda$ of a rich range is cancelled.

At S 304, since the NOx regeneration is completed, sp flag is set as 0.

Figure 6:
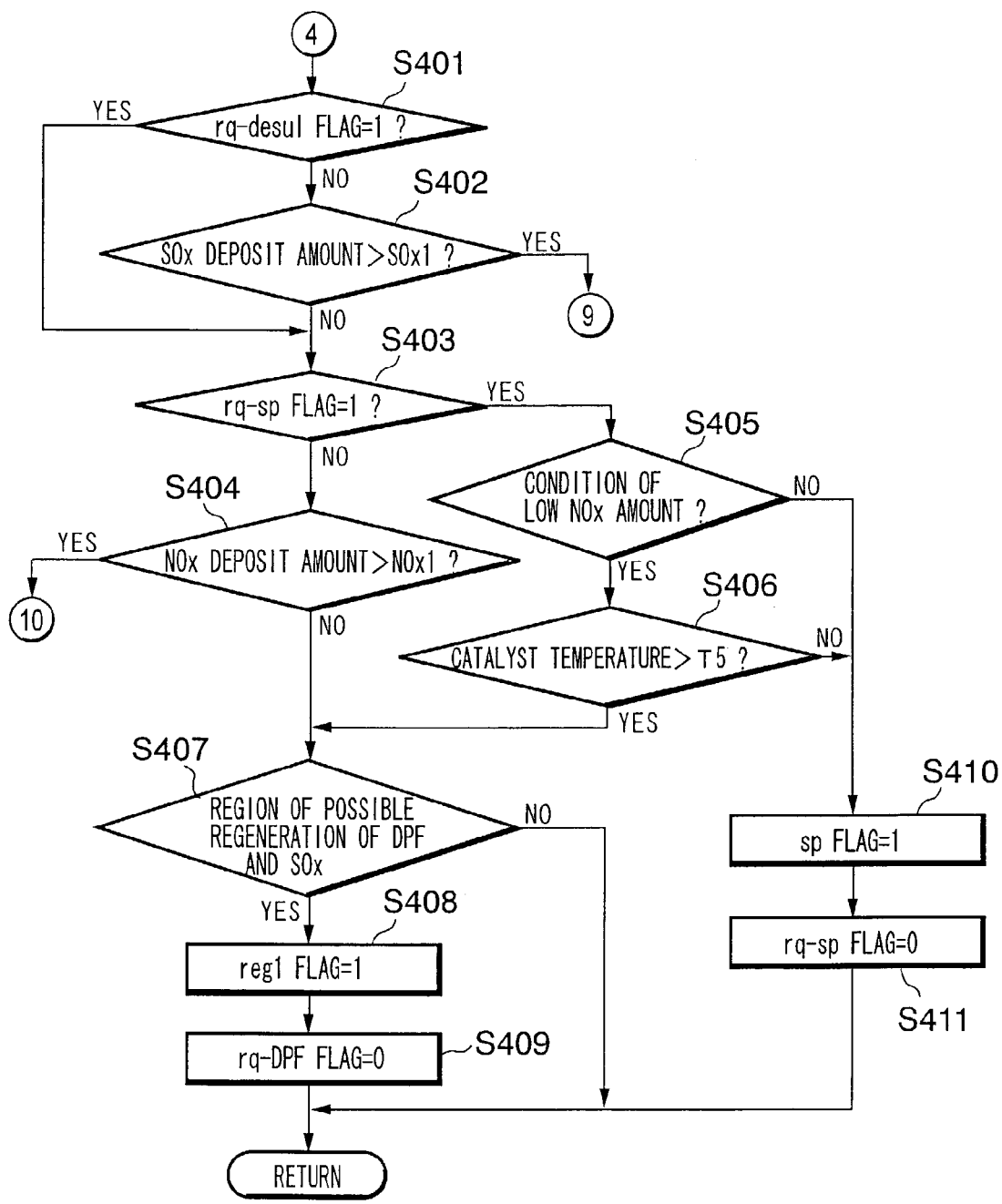
FIG. 6 is a flowchart of an exhaust purification control (5).

A priority making flow (1) of regeneration in FIG. 6 will be explained. A flow in FIG. 6 begins with setting a DPF regeneration demand (rq-DPF flag=1). The flow describes the regeneration priority when DPF regeneration demand and at least one of NOx regeneration demand and SOx regeneration demand are made simultaneously.

At S 401, it is judged whether or not the SOx regeneration demand is made or rq-desul flag=1. If the SOx regeneration demand is made, the process goes to S 403. If the SOx regeneration demand is not made, the process goes to S 402 wherein it is judged whether or not it is time to regenerate the SOx based upon when the SOx deposit amount reaches a predetermined value SOx 1. When it is time to regenerate the SOx, the routine goes branched to S 901 in FIG. 11. If it is not time to regenerate the SOx, the process goes to S 403.

At S 403, it is judged whether or not the NOx regeneration demand is made or rq-sp flag=1. If the NOx regeneration demand is made, the process goes to S 405. If the SOx regeneration demand is not made, the process goes to S 404 wherein, in the same way as at S 14, it is judged whether or not it is time to regenerate the NOx based upon when the NOx deposit amount reaches a predetermined value NOx 1. When it is time to regenerate the NOx, the routine goes branched to S 1001 in FIG. 11. If it is not time to regenerate the NOx, the process goes to S 407 to prioritize the DPF regeneration because the DPF regeneration demand is made, but NOx regeneration demand is not made.

On the other hand, at S 405, in case where both the DPF regeneration demand and the NOx regeneration demand are made, it is judged whether or not an engine operating condition is a condition where an amount of NOx emitted from the engine is small, or a normal engine operating condition (low amount of NOx). In case of an engine operating condition with the low amount of the NOx, if regeneration of the NOx is more or less delayed, deterioration of an exhaust gas emitted from a tailpipe to outside of a vehicle does not occur substantially. Therefore, it is preferable that the DPF regeneration that has an impact on an engine driveabilty is prioritized. Accordingly, the process goes to S 406.

In case of an engine condition with more than a predetermined amount of the NOx, namely in case of an engine acceleration condition, the NOx regeneration is prioritized for preventing deterioration of an exhaust gas emitted from the tailpipe to the outside of the vehicle. Accordingly, the process goes to S 410.

At S 406, it is judged whether or not the catalyst temperature goes beyond a predetermined value T5 that is high enough for activating an oxidizing catalyst carried on DPF 14. When the catalyst temperature is higher than T52, the process goes to S 407 for prioritizing the DPF regeneration.

When the catalyst temperature is lower than T5, a sufficient oxidizing heat does not occur even by throttling an intake air so as to increase the catalyst temperature. Therefore, it takes time to reach the temperature of possible regeneration and also deterioration of an exhaust gas emitted from the tailpipe during increasing the temperature might happen. Accordingly, the process goes to S 410 for prioritizing the NOx regeneration.

Figure 19:
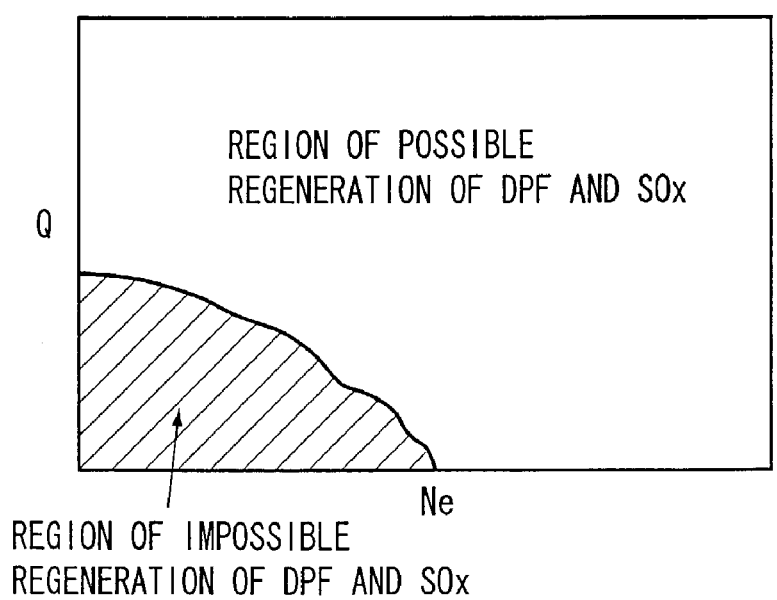
FIG. 19 is a view showing a region of a possible regeneration of the DPF and SOx.

At S 407, for prioritizing the DPF regeneration, it is judged whether or not an engine operating condition (Ne, Q) is in a region where the DPF regeneration and the SOx regeneration are possible to make according to FIG. 19. When the engine operating condition is in the region of making possible the regeneration thereof, the process goes to S 408.

At S 408, regI flag is set as 1 for prioritizing the DPF regeneration.

At S 409, since regI flag is set as 1, rq-DPF flag is set as 0.

At S 410, sp flag is set as 1 for prioritizing the NOx regeneration because of a case for prioritizing the NOx regeneration. At S 411, since sp flag is set as 1, rq-sp flag is set as 0.

The region of the possible regeneration of DPF and SOx shown in FIG. 19 will be explained in detail. A temperature of DPF 14 (or temperature of NOx trap catalyst 13) is required to increase more than a predetermined value for regeneration of DPF 14 (or SOx). Since an exhaust temperature of a diesel engine usually is lower than the predetermined value, the temperature of DPF 14 (or temperature of the NOx trap catalyst 13) will be increased to more than a predetermined value for the regeneration.

There is a relation between an exhaust gas temperature and an exhaust $\lambda$. Namely, as the exhaust $\lambda$ is smaller, the exhaust gas temperature becomes higher. Accordingly, the exhaust $\lambda$ is set small for increasing the temperature. However, if the exhaust $\lambda$ is set small, HC and CO in the exhaust gas deteriorate as a side effect. As the exhaust $\lambda$ is set smaller, HC and CO deteriorate more. Namely, as an increase amount of the temperature required for the regeneration is larger, HC and CO deteriorate more. As described, temperature increase performance and exhaust emission performance have a trade-off relation. The region of possible regeneration of DPF 14 and the SOx in FIG. 19 is the region set beforehand so that the exhaust gas emission performance does not go beyond an allowance value when the exhaust temperature is increased.

Namely, the temperature increasing from the region of impossible regeneration of the SOx becomes as large as the exhaust gas emission performance deteriorates beyond an allowance value. Therefore, the regeneration is not carried out in this region.

Figure 7:
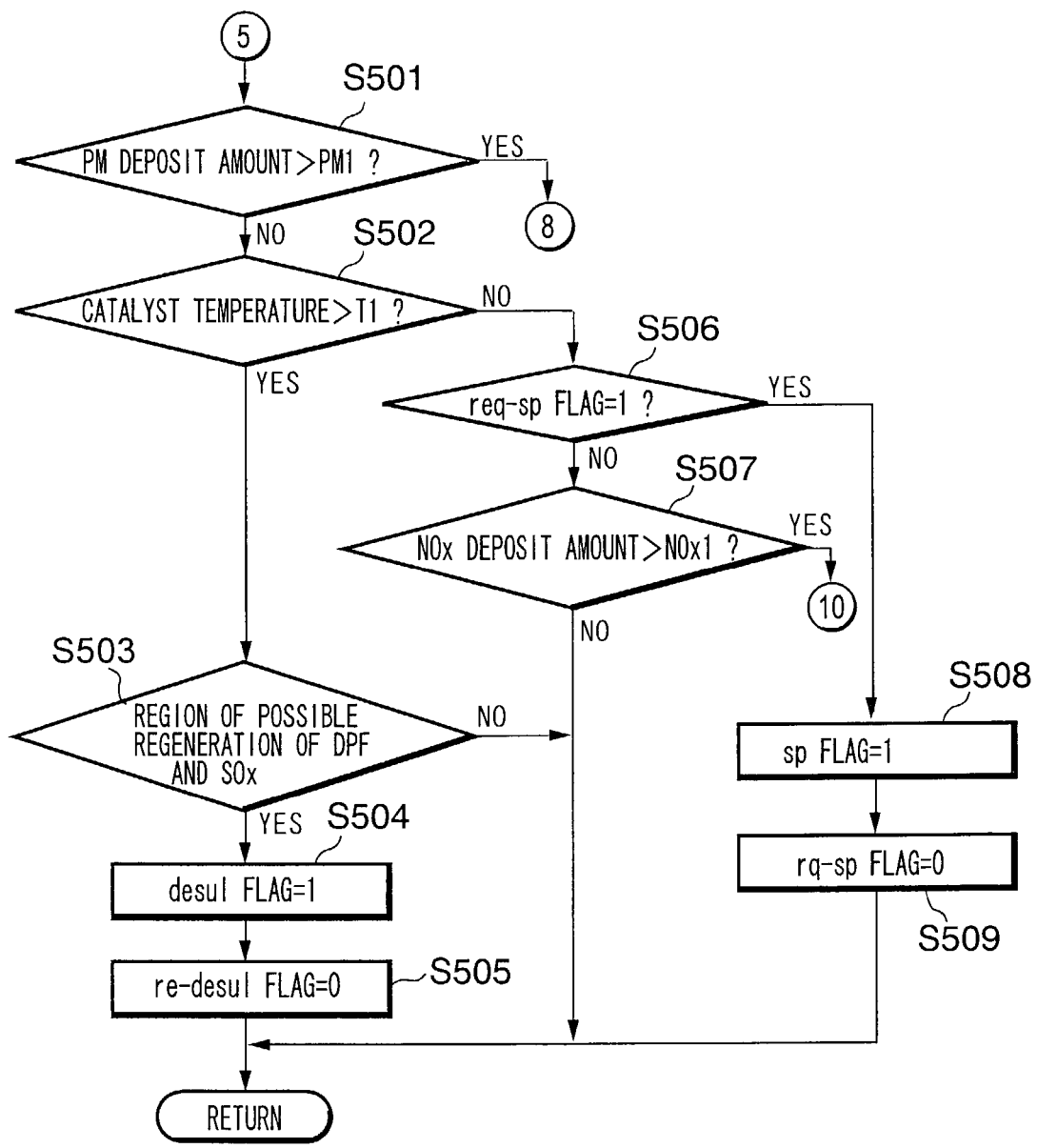
FIG. 7 is a flowchart of an exhaust purification control (6).

A priority making flow (2) of regeneration in FIG. 7 will be explained. A flow in FIG. 7 begins with setting a SOx regeneration demand (rq-desul flag=1). The flow describes the regeneration priority when NOx regeneration demand and SOx regeneration demand occur simultaneously.

At S 501, it is judged whether or not it is time to regenerate DPF 14 based upon when the PM deposit amount of DPF 14 reaches a predetermined value PM 1 the same as at S 12 before the SOx regeneration is carried out after the SOx regeneration demand occurs. When it is time to regenerate DPF 14, the routine goes branched to S 801 in FIG. 10. In this case the DPF regeneration is finally prioritized according to a flowchart in FIG. 6. If it is not time to regenerate DPF 14, the process goes to S 502.

At S 502, it is judged whether or not the catalyst temperature is higher than a predetermined value (for example, activation temperature of NOx trap catalyst 13) T1 that is suitable for the SOx regeneration. The activation temperature T1 of NOx trap catalyst 13 is lower than the activation temperature T5 for oxidizing function of DPF 14.

When the catalyst temperature is higher than T1, the process goes to S 503 for prioritizing the SOx regeneration.

When the catalyst temperature is lower than T1, a sufficient oxidizing heat does not occur even by throttling an intake air so as to increase the catalyst temperature. Therefore, it takes time to reach the temperature of possible regeneration and also deterioration of an exhaust gas emitted from the tailpipe during increasing the temperature might happen. Accordingly, when the NOx regeneration demand occurs, it is preferable to prioritize the NOx regeneration. Therefore, the process goes to S 506.

At S 503, for prioritizing the DPF regeneration, it is judged whether or not an engine operating condition (Ne, Q) is in a region where the DPF regeneration and the SOx regeneration are possible to make according to FIG. 19. When the engine operating condition is in the region of making possible the regeneration thereof, the process goes to S 504.

At S 504, desul flag is set as 1 for prioritizing the DPF regeneration.

At S 505, since desul flag is set as 1, rq-desul flag is set as 0.

At S 506, it is judged whether or not the NOx regeneration demand occurs or rq-sp flag=1. If the NOx regeneration demand occurs, the process goes to S 508 for prioritizing the NOx regeneration. If the NOx regeneration demand does not occur, the process goes to S 507 wherein, in the same way as at S 14, it is judged whether or not it is time to regenerate NOx based upon when the NOx deposit amount reaches a predetermined value NOx 1. When it is time to regenerate the NOx, the routine goes branched to S 1001 in FIG. 12.

At S 508, sp flag is set as 1 for prioritizing the NOx regeneration because of a case for prioritizing the NOx regeneration. At S 509, since sp flag is set as 1, rq-sp flag is set as 0.

Control of a prevention mode of DPF melting in FIG. 8 will be explained. When the DPF regeneration and the SOx regeneration are completed and rec flag=1 in a flowchart in FIG. 3 or 4, a routine in FIG. 8 starts.

At S 601, the exhaust λ is controlled to be less than a predetermined value, for example, λ≦1.4 to control an oxygen density in the exhaust gas to less than a predetermined density so that the particulate matters left unburned or deposited do not burn for a moment and is not melted, for a temperature of DPF 14 is very high immediately after the regeneration or a high load engine operation. An intake air is basically controlled by the throttle valve to be a target intake air amount for preventing DPF melting shown in FIG. 15 and is feedback-controlled based upon a signal from an air-fuel ratio sensor.

At S 602, it is judged whether or not the DPF temperature goes down below a predetermined value T3 (for example, 500 degrees C.) at which rapid oxidizing of the particulate matters does not start. If the DPF temperature is higher than T3, the control of the exhaust λ keeps on. If the DPF temperature is lower than T3, the process goes to S 603 because DPF melting is avoidable even when the oxygen density becomes equal to an atmosphere.

At S 603, since there is no possibility of the DPF melting, the control of the exhaust λ is cancelled. At S 604, since the prevention mode of the DPF melting ends, rec flag is set as 0.

According to the embodiment, the timing ("timing": a certain period of time, not a point) of the DPF regeneration takes place simultaneously with the timing of the SOx regeneration or the timing of the NOx regeneration, the DPF regeneration is carried out with a first priority and thereafter, the SOx regeneration or the NOx regeneration is carried out. Thereby, deterioration of an engine driveability during the regeneration is prevented by prioritizing the DPF regeneration, for as the particulate matter deposit amount increases, the exhaust gas resistance increases more and the engine driveability deteriorates.

Figure 4:
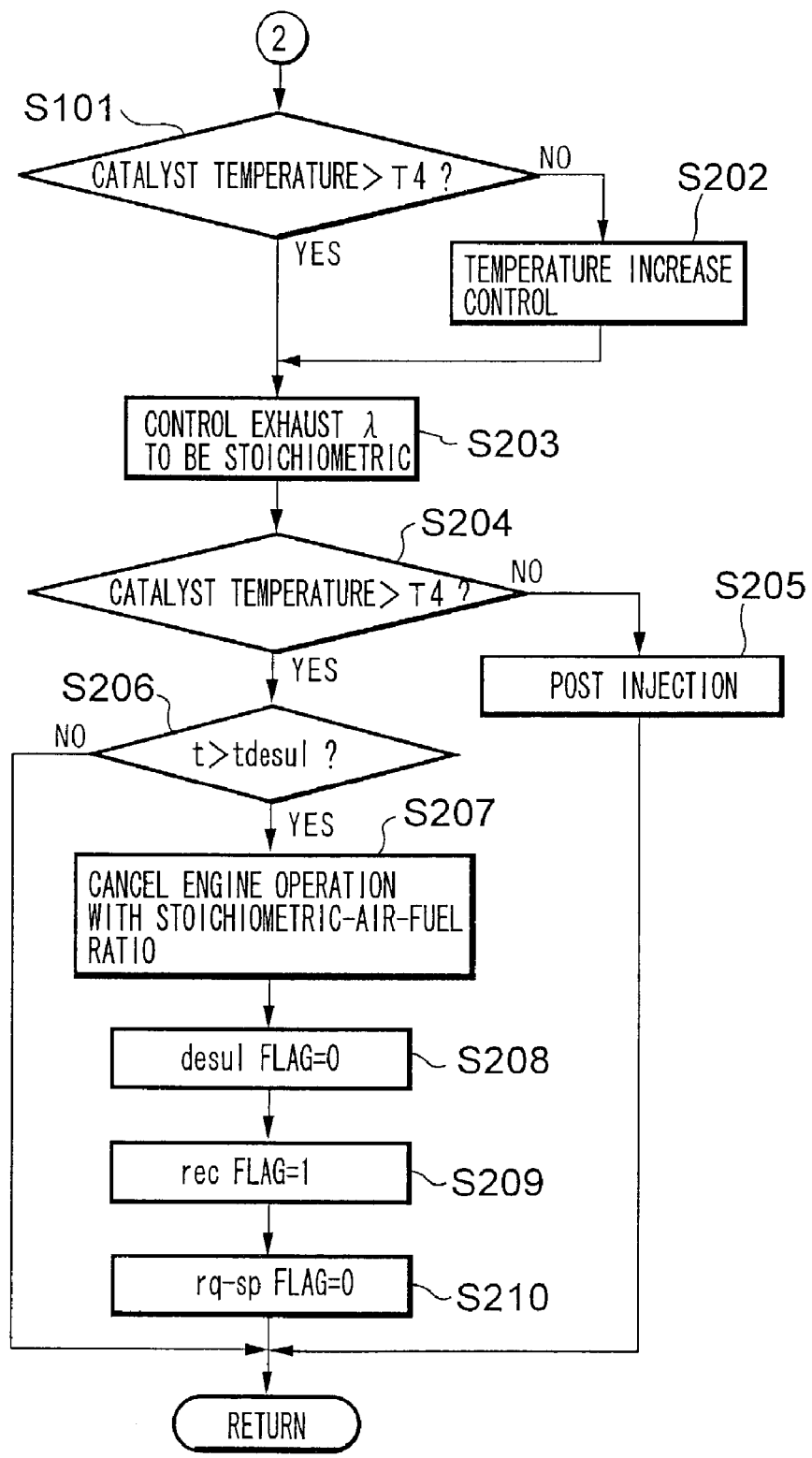
FIG. 4 is a flowchart of an exhaust purification control (3).

According to the embodiment, when the timing of the SOx regeneration and the timing of the NOx regeneration take place, the SOx regeneration only is carried out and the NOx regeneration is not carried out (S210 in FIG. 4). Thereby, the regeneration process can be efficient. Namely, since an air-fuel ratio is in from a stoichiometric to a rich range at the SOx regeneration, if the SOx regeneration is carried out, the NOx regeneration can be carried out simultaneously and carrying out the NOx regeneration separately is not needed.

According to the embodiment, when the timing of the DPF regeneration and the timing of the NOx regeneration take place simultaneously and also an oxidizing function of DPF 14 is not active, the NOx regeneration is carried out first (S 406 in FIG. 6), thereby making the regeneration process efficient. Namely, when the oxidizing function of DPF 14 is not active, for example, immediately after an engine starts, even if an exhaust gas temperature is high, it takes time to reach a temperature condition at which the DPF regeneration can be carried out due to heat inertia. Therefore, the NOx regeneration is carried out first until the DPF reaches a temperature condition at which the DPF regeneration can be carried out. Utilizing an increase of the exhaust gas temperature due to the exhaust λ being made rich for the NOx regeneration, the DPF regeneration can be carried out without deterioration of an exhaust gas emission performance.

According to the embodiment, when the timing of the SOx regeneration and the timing of the NOx regeneration take place simultaneously and also NOx trap catalyst 13 is not active, the NOx regeneration is carried out first (S 502 in FIG. 7), thereby making the regeneration process efficient. Namely, when NOx trap catalyst 13 is not active, for example, immediately after an engine starts, even if an exhaust gas temperature is high, it takes time to reach a temperature condition at which the SOx regeneration can be carried out due to heat inertia. Therefore, the NOx regeneration is carried out first until the catalyst reaches a temperature condition at which the SOx regeneration can be carried out. Utilizing an increase of the exhaust gas temperature due to the exhaust λ being made rich for the NOx regeneration, the SOx regeneration can be carried out without deterioration of an exhaust gas emission performance.

According to the embodiment, when a NOx amount emitted from an engine is large, for example, at an acceleration condition, the regeneration process can be carried out restraining deterioration of an exhaust gas emission performance by prioritizing the NOx regeneration.

Figure 8:
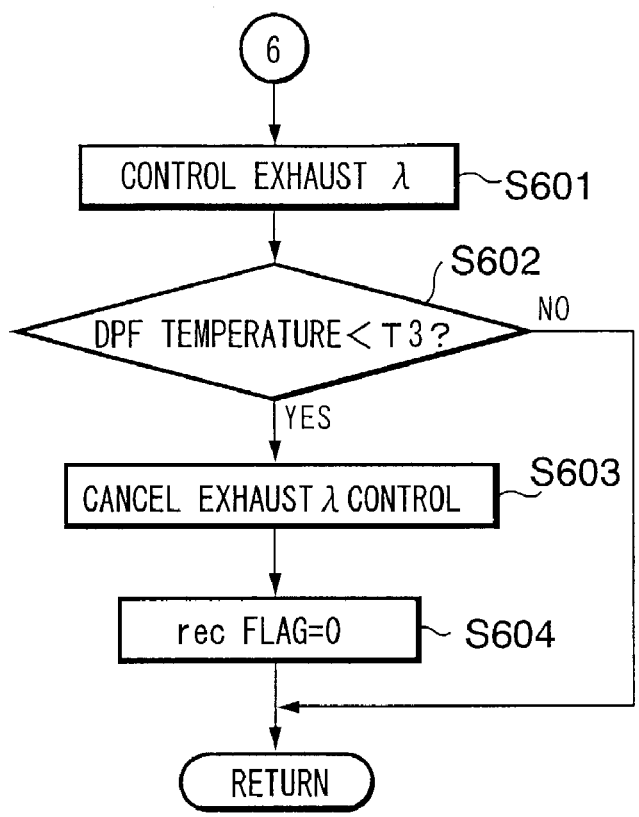
FIG. 8 is a flowchart of an exhaust purification control (7).
Figure 9:
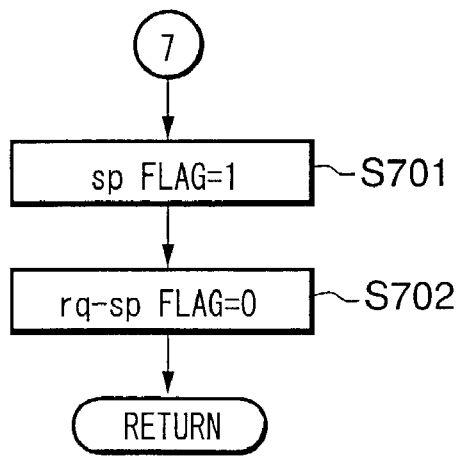
FIG. 9 is a flowchart of an exhaust purification control (8).

According to the embodiment, when the DPF temperature goes beyond a predetermined value T3 after the DPF regeneration or the SOx regeneration is carried out, an oxygen density in the exhaust gas is controlled to be less than a predetermined density (S 601, S 602 in FIG. 8). Thereby, melting the DPF is properly avoided. Namely, the DPF temperature is very high after the DPF regeneration or the SOx regeneration is carried out and therefore, the particulate matters left unburned thereon possibly burn abnormally. Accordingly, melting the DPF is properly avoided by performing a prevention process of DPF melting such that an oxygen density in the exhaust gas is controlled to be less than a predetermined density.

According to the embodiment, a judgment unit of regeneration timing comprises a first judgment unit of DPF regeneration demand that judges a DPF regeneration demand based upon a particulate matter deposit amount on a DPF;

a second judgment unit (S12, S 13 in FIG. 2) of SOx regeneration demand that judges SOx regeneration demand based upon a SOx deposit amount on a NOx trap catalyst;

a third judgment unit (S 407 in FIG. 6) of a possible SOx regeneration that judges whether or not a SOx regeneration is possible based upon an engine operating condition;

a fourth judgment unit (S 503 in FIG. 7) of a possible DPF regeneration that judges whether or not a DPF regeneration is possible based upon the engine operating condition;

a fifth judgment unit of a DPF regeneration timing that judges it is time to regenerate the DPF based upon when the DPF regeneration demand and the possible DPF regeneration are judged; and a sixth judgment unit of a SOx regeneration timing that judges it is time to regenerate the SOx based upon when the SOX regeneration demand and the possible SOx regeneration are judged whereby the regeneration of the DPF and SOx is not carried out in an engine operating condition where deterioration of an exhaust gas emission performance goes beyond an allowance level due to a temperature increase. Therefore, the problems caused by the regeneration can be avoided.

This application claims priority to Japanese Patent Application No. 2002-145366 filed May 20, 2002. The entire disclosure of Japanese Patent Application No. 2002-145366 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing description of the embodiments according to the present invention is provided for illustration only, and not for the purpose of limiting the invention as defined by the appended claims and their equivalents. Moreover, features of the different embodiments may be combined.

What is claimed:

1. An exhaust gas apparatus for purifying an exhaust gas in an internal combustion engine comprising:

an exhaust passage in the internal combustion engine;

a diesel particulate filter disposed in the exhaust passage to trap particulate matter in the exhaust gas flowing into the diesel particulate filter;

a NOx trap catalyst disposed in the exhaust passage, the NOx trap catalyst trapping NOx flowing into the NOx trap catalyst when an exhaust-air-fuel ratio is in a lean range and purifying the trapped NOx when the exhaust-air-fuel ratio is in a rich range; and a controller that controls the internal combustion engine, wherein the controller separately judges timing of diesel particulate filter regeneration that purifies the particulate matter deposited on the diesel particulate filter, timing of SOx regeneration that purifies SOx deposited on the NOx trap catalyst, and timing of NOx regeneration that purifies NOx deposited on the NOx trap catalyst, and wherein when the diesel particulate filter is active and when the timing of the diesel particulate filter regeneration takes place simultaneously with the timing of the SOx regeneration or the timing of the NOx regeneration, the controller carries out the diesel particulate filter regeneration first and thereafter, carries out the SOx regeneration or the NOx regeneration, wherein the diesel particulate filter oxidizes an exhaust component flowing thereto, and wherein when the oxidization of the diesel particulate filter is not active and the controller detects that the timing of the diesel particulate filter regeneration and the timing of the NOx regeneration take place simultaneously, the controller carries out the NOx regeneration prior to the diesel particulate filter regeneration.

2. An exhaust gas apparatus according to claim 1, wherein when the NOx trap catalyst is not active and when the controller detects that the timing of the SOx and the timing of the NOx regeneration take place simultaneously, the controller carries out the NOx regeneration prior to the SOx regeneration.

* * * * *